(12) United States Patent
Phillips

(10) Patent No.: US 8,123,135 B2
(45) Date of Patent: Feb. 28, 2012

(54) VERY SMALL SUBCARD FOR IDENTIFICATION APPLICATIONS

(75) Inventor: Simon Phillips, York (GB)

(73) Assignee: MasterCard International, Inc., Purchase, NY (US)

( * ) Notice: Subject to any disclaimer, the term of this patent is extended or adjusted under 35 U.S.C. 154(b) by 1317 days.

(21) Appl. No.: 11/700,279

(22) Filed: Jan. 31, 2007

(65) Prior Publication Data

US 2008/0068181 A1 Mar. 20, 2008

Related U.S. Application Data

(60) Provisional application No. 60/843,044, filed on Sep. 8, 2006.

(51) Int. Cl.
*G06K 19/06* (2006.01)

(52) U.S. Cl. .......................... 235/492; 235/487

(58) Field of Classification Search .............. 235/492
See application file for complete search history.

(56) References Cited

U.S. PATENT DOCUMENTS

| | | | | |
|---|---|---|---|---|
| 5,936,227 A * | 8/1999 | Truggelmann et al. | ....... | 235/492 |
| 6,561,432 B1 | 5/2003 | Vedder et al. | | |
| 6,685,097 B1 * | 2/2004 | Housse | ............ | 235/492 |
| 2002/0008147 A1 * | 1/2002 | Coiton et al. | ........... | 235/492 |
| 2003/0085288 A1 * | 5/2003 | Luu | ........... | 235/492 |
| 2004/0223305 A1 * | 11/2004 | Amiot et al. | ........... | 361/737 |
| 2005/0258245 A1 * | 11/2005 | Bates et al. | ........... | 235/451 |
| 2006/0105810 A1 * | 5/2006 | Gnuschke | ........... | 455/558 |
| 2006/0255157 A1 * | 11/2006 | Launay et al. | ........... | 235/492 |
| 2008/0089182 A1 * | 4/2008 | Scheybal | ........... | 368/10 |
| 2009/0160651 A1 * | 6/2009 | Klein | ........... | 340/572.1 |

FOREIGN PATENT DOCUMENTS

DE 19646717 A1 * 5/1998

OTHER PUBLICATIONS

International Standard, "Identification Cards—Physical Characteristics," ISO/IEC (Third Edition, Nov. 1, 2003).

* cited by examiner

*Primary Examiner* — Thien M. Le
*Assistant Examiner* — Sonji Johnson
(74) *Attorney, Agent, or Firm* — Buckley, Maschoff & Talwalkar LLC

(57) ABSTRACT

An apparatus includes a first substantially card-shaped body. The first card-shaped body has a plurality of voids formed therein to define sides of a second substantially card-shaped body. The second body is smaller than the first body and is adapted to be detached from the first body. The second body is joined to the first body by a plurality of breakable tabs. The voids have a total length, inclusive of the tabs, that does not exceed about 64 mm.

13 Claims, 5 Drawing Sheets

US 8,123,135 B2

VERY SMALL SUBCARD FOR IDENTIFICATION APPLICATIONS

CROSS-REFERENCE TO RELATED APPLICATION

This application claims the benefit of provisional patent application Ser. No. 60/843,044, filed Sep. 8, 2006 and entitled "Method of making proximity payment device", which provisional application is incorporated herein by reference.

BACKGROUND

Proximity payment devices are in widespread use. For example, proximity payment cards in the well-known ID-1 standard size incorporate a radio frequency identification (RFID) integrated circuit (IC) and an antenna. In use, the card is presented to a proximity reader that is part of a point of sale (POS) terminal to initiate a payment transaction. The card receives a wireless interrogation signal from the proximity reader via the card antenna. The interrogation signal powers up the RFID IC, which exchanges RF communications with the proximity reader. As part of the communications, the RFID IC provides a payment account number to the POS terminal. The POS terminal uses the payment account number to obtain authorization for the payment transaction.

One well-known standard for proximity payment applications is known as "PayPass" and was promulgated by MasterCard International Incorporated, the assignee hereof.

It has also been proposed that proximity identification devices similar to proximity payment cards may be used for other purposes, such as transit payment/access, travel documents (e.g., "RFID-enabled passports") and/or for other identification purposes. Cards of this kind, including proximity payment cards that incorporate RFID chips, fall under the rubric of "contactless smart cards".

According to other proposals, proximity payment devices and other identification devices may be provided by incorporating a contactless smart card, in the standard ID-000 size (nominally 25 mm by 15 mm), into a device such as a wristwatch, bracelet or wristband. In the above-referenced provisional patent application, the present inventor has disclosed an approach for assembling a proximity payment device of this kind. According to this approach, an ID-000 "subcard" is detachably carried in a larger card-shaped body having the standard ID-1 dimensions. The carrier card body includes an antenna that is coupled to an RFID-IC in the subcard. Because the carrier is of the standard ID-1 size, it can be conveniently processed by customary "personalization" equipment that is used to load card-specific data (e.g., the payment account number) into ID-1 proximity payment cards. Communications between the personalization equipment and the subcard are carried out by way of the antenna in the carrier. The personalization equipment may also print card-specific information on the subcard. After personalization of the subcard, it may be detached from the carrier and inserted into a device such as a wristwatch. The wristwatch incorporates an antenna to which the subcard RFID chip may be coupled, and the wristwatch can then be used as a proximity payment device.

The present inventor has recognized that even the relatively small ID-000 contactless smart card may be too large for convenient insertion into some wristwatches or other items. The present inventor has also identified another potential disadvantage of the ID-1 carrier/ID-000 subcard arrangement. That is, the voids in the carrier which define the subcard fall within the region of the ID-1 dimensions that is contacted by a card-handling suction cup in a commonly used type of personalization equipment. Consequently, when such personalization equipment is to be used with the ID-1 carrier/ID-000 subcard arrangement, the personalization equipment is typically modified to relocate the suction cup so that it is clear of the voids in the carrier. The modification of the personalization equipment may be a significant expense and inconvenience for some payment card issuers.

DETAILED DESCRIPTION

In general, and for the purpose of introducing concepts of embodiments of the present invention, a subcard smaller than the ID-000 size is formed in an ID-1 sized carrier. For example, the subcard may be nominally 17 mm by 15 mm, and thus may be small enough to fit conveniently in women's wristwatches or other relatively small devices. Further, the voids which define the subcard may be located within the ID-1 dimensions so as to be clear of a "keep-out zone" at which a suction cup in standard personalization equipment contacts conventional ID-1 proximity payment cards. Consequently, it may be feasible to perform personalization processing of the carrier/subcard arrangement with standard, unmodified personalization equipment.

Figure 1:
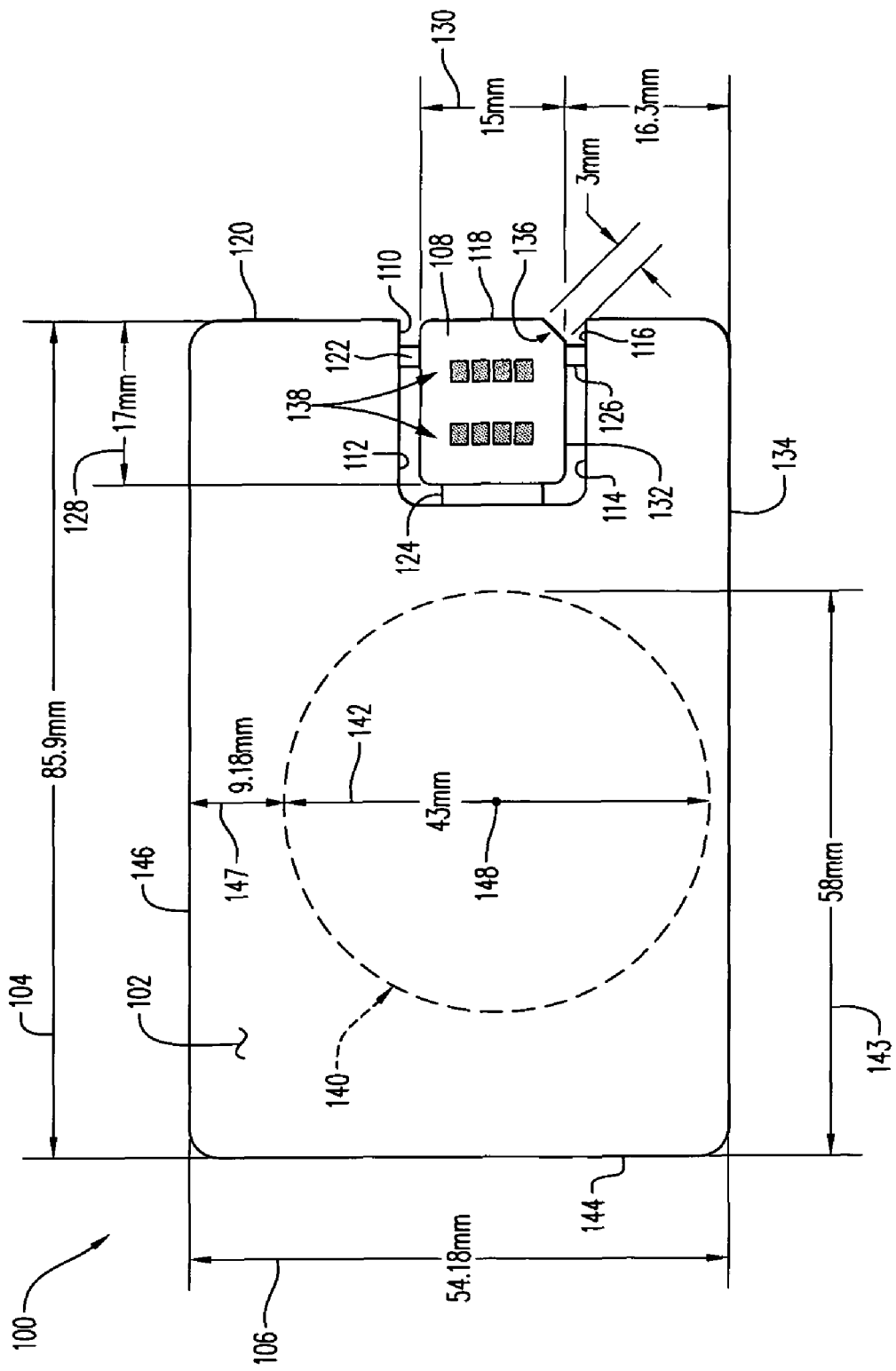
FIG. 1 is a plan view showing dimensional aspects of an ID-1 carrier/small subcard arrangement provided according to some embodiments.

FIG. 1 is a plan view showing dimensional aspects of an ID-1 carrier/small subcard arrangement 100 provided according to some embodiments. The carrier/subcard arrangement 100 includes a carrier 102, formed as a plastic body, which may have dimensions that are substantially in accordance with the well-known ID-1 standard for identification cards. For example, as indicated at 104, the carrier 102 may have a length dimension of 85.9 mm; also, as indicated at 106, the carrier 102 may have a height dimension of 54.18. In an alternative embodiment, the carrier may have length and height dimensions of 85.6 mm and 53.98 mm, respectively. In either of these embodiments, and in other alternative embodiments, the carrier may be in substantial compliance with at least some of the dimension requirements of the ID-1 standard, and may be said to have dimensions of substantially 86 mm by 54 mm. The thickness of the carrier 102 may be substantially in accordance with a thickness dimension prescribed by the ID-1 standard. In still other embodiments, the carrier 102 may have other dimensions besides those referred to above.

The carrier/subcard arrangement 100 also includes a subcard 108 defined within the carrier 102 by voids 110, 112, 114, 116. The subcard 108 is formed as a plastic body within and integrally with the carrier 108. The subcard 108 has a right edge 118 that is shared with the right edge 120 of the carrier 102. In other words, the right edge 118 of the subcard 108 is defined by the right edge 120 of the carrier 102.

The subcard 108 is joined to the carrier 102 by breakable tabs 122, 124, 126 that are integrally formed with the subcard 108 and the carrier 102 and that separate the voids from each other. Specifically, the tab 122 is between voids 110, 112; the tab 124 is between voids 112, 114; and the tab 126 is between voids 114, 116. One or more of the tabs 122, 124, 126 may be of reduced thickness relative to the carrier 102 and the subcard 108.

As indicated at 128, the subcard has a length dimension of substantially 17 mm; and as indicated at 130, the subcard has a height dimension of substantially 15 mm. Consequently, the total length of the voids 110, 112, 114, 116, inclusive of the tabs which separate the voids, is substantially 49 mm (i.e., twice the length of the subcard plus one times the height of the subcard).

In the particular embodiment shown, the subcard 108 is defined within the carrier 102 such that the lower edge 132 of the subcard 108 (the lower edge 132 corresponding substantially to the length dimension of the subcard 108) is parallel to the lower edge 134 of the carrier 102 (the lower edge 134 corresponding substantially to the length dimension of the carrier 102). However, according to an alternative embodiment which is not shown, the subcard may be defined within the carrier such that its length dimension is parallel to the height dimension of the carrier.

The subcard 108 is substantially rectangular, with rounded 90° corners, except that the lower right-hand corner 136 of the subcard 108 is effectively cut-off, i.e., formed of two 135° rounded sections with a 3 mm length therebetween. The 3 mm length is oriented at 45° relative to the lower edge 132 and the right edge 118 of the subcard 108. This cut-off corner 136 may aid in correctly installing the subcard in a proximity payment device.

Figure 4:
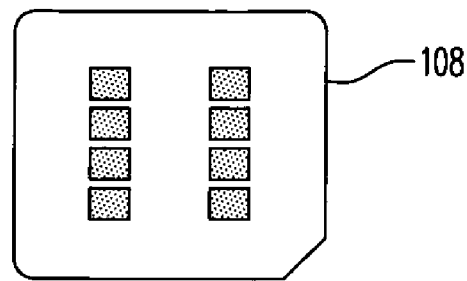
FIG. 4 is a plan view of the subcard after it has been detached from the carrier.
Figure 4A:
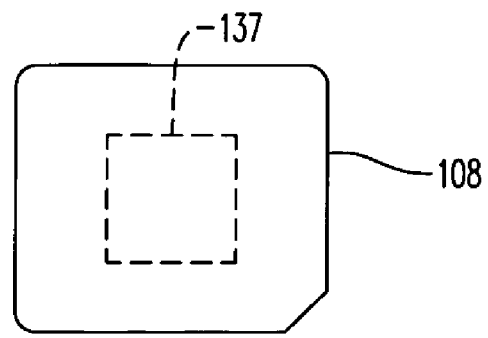
FIG. 4A is a schematic plan view of the subcard, showing in phantom an RFID IC embedded in the subcard.

The subcard 108 may include a substantially conventional RFID IC, which is not shown in FIG. 1, but is indicated by reference numeral 137 in FIG. 4A. The RFID IC 137 may be embedded within the subcard 108. Further, conventional contacts 138 (FIG. 1) are formed on the surface of the subcard 108 to allow for electrically conductive connection to the RFID IC 137 (FIG. 4A, not shown in FIG. 1) of the subcard 108. One or more of the contacts 138 are electrically conductively coupled to the RFID IC 137

It will be noted from FIG. 1 that the subcard 108, and the voids 110, 112, 114, 116 which define the subcard 108, are all clear of (away from) a keep-out zone (represented by dashed line circle 140) on the surface of the carrier 102. The keep-out zone is the locus at which a suction cup (not shown) in a standard conventional item of card personalization equipment (not shown) contacts a conventional ID-1 card when such a conventional ID-1 card is processed by the standard personalization equipment. If the subcard were located within the ID-1 carrier so as to place the contacts 138 in the location called for by the ID-1 standard, then at least one of the resulting voids (not shown) would overlap with the keep-out zone 140 and would therefore prevent proper operation of the conventional personalization equipment. Accordingly, if the subcard were located within the ID-1 carrier so as to place the contacts 138 in the location called for by the ID-1 standard, it would be necessary to perform an expensive and inconvenient modification to the standard personalization to reposition the suction cup so as to render it capable of properly handling such a hypothetical carrier/subcard arrangement. However, because of the small size and the particular location (as shown in FIG. 1) of the subcard 108 within the carrier 102, the carrier/subcard arrangement 100 can be properly handled and personalized by standard, unmodified personalization equipment.

As will be seen, one factor, in addition to the small size of the subcard, that makes possible the favorable location of the subcard 102 within the carrier is the fact that (in accordance with an invention disclosed in the above-referenced provisional patent application) the subcard 108 may be personalized by wireless communication with the RFID IC 137 via an antenna 142 (FIG. 2) embedded in the carrier 102. For this reason, and since direct electrical contact with the contacts 138 via the personalization equipment is not required, the subcard may be located at any convenient or advantageous position within the carrier, and need not be located so as to place the contacts 138 in the standard ID-1 contact location for interaction by direct electrical contact with standard personalization equipment of the type that interacts with ID-1 contact smart cards.

Referring once more to FIG. 1, the keep-out zone 140 is, as noted, shaped as a circle. The keep-out zone 140 has a diameter 142 of substantially 43 mm. The right-most point of the keep-out zone 140 is at substantially 58 mm (as indicated at 143) from the left edge 144 of the carrier 102. The point of the keep-out zone that is nearest the top edge 146 of the carrier 102 is substantially 9.18 mm distant (as indicated at 147) from the top edge 146. Consequently, the center 148 of the keep-out zone 140 is substantially 30.7 mm from the top edge 146 and is substantially 36.5 mm from the left edge 144.

Referring again to FIG. 2, the antenna 142 embedded in the carrier 102 is electrically conductively coupled by electrically conductive connections 202, 204 to contacts 138-1 and 138-2, respectively, on the subcard 108. The contacts 138-1 and 138-2 are in turn electrically conductively coupled to the RFID IC 137 (FIG. 4A, not shown in FIG. 2) of the subcard 108, so that the antenna 142 is (so long as the subcard 108 has not yet been detached from the carrier 102) electrically conductively coupled to the RFID IC 137 via the connections 202, 204 and the contacts 138-1 and 138-2.

The connection 202 passes through tab 124 as part of its path from the antenna 142 to the contact 138-1; and the connection 204 passes through tab 122 as part of its path from the antenna 142 to the contact 138-2. It should be understood that the layout of the connections 202, 204 and/or of the antenna 142 may be different from that shown, and that the routing of the connections 202, 204 through the tabs may be different, and may for example include tab 126 instead of tab 124 or 122. As another alternative, both connections 202 and 204 may be routed through tab 124. Similarly, contacts other than contacts 138-1 and 138-2 may be used as the connections to the RFID IC 137 from the antenna 142.

Figure 3:
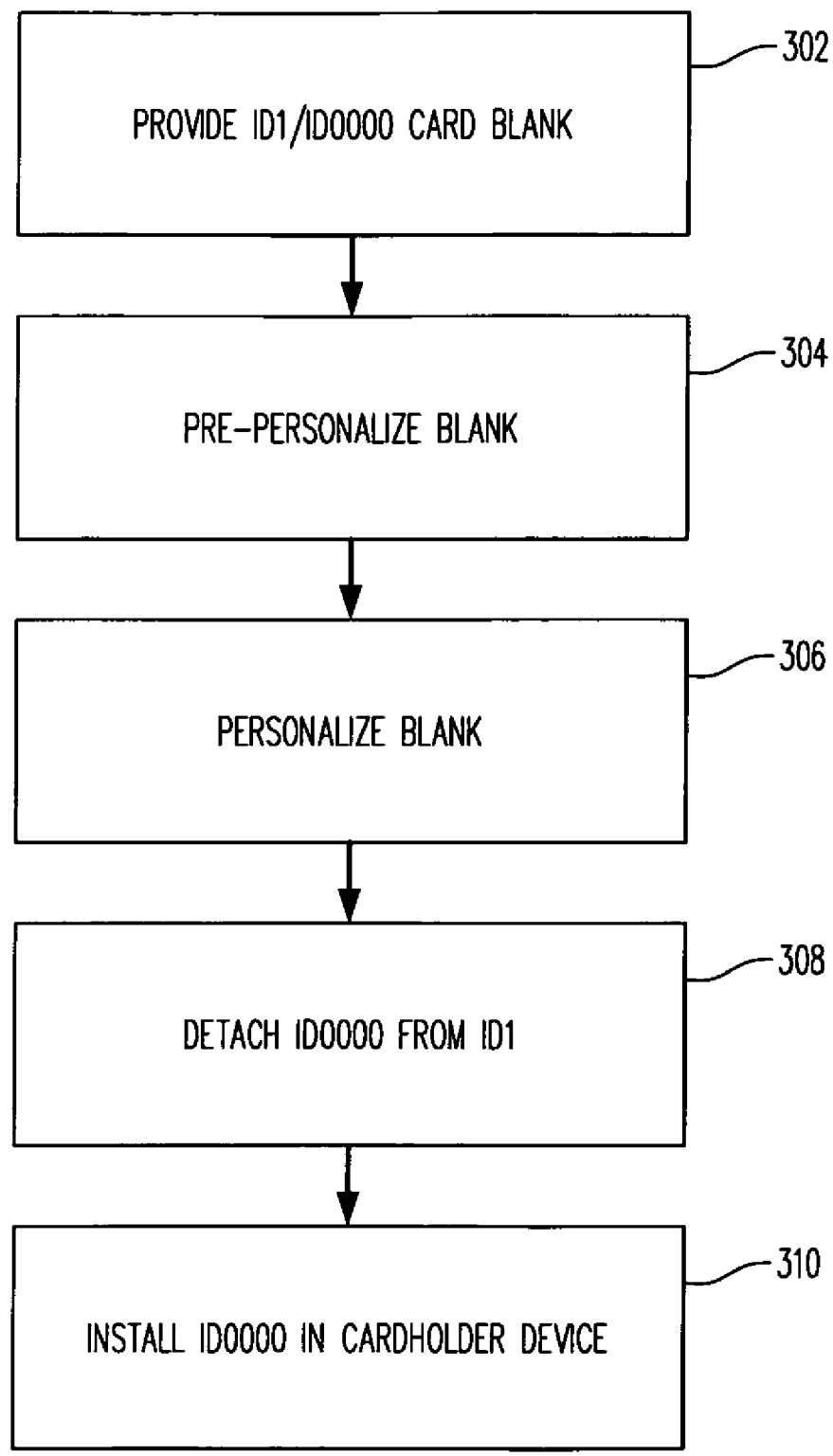
FIG. 3 is a flow chart that illustrates a process for making a proximity payment device in accordance with aspects of the present invention.

FIG. 3 is a flow chart that illustrates a process for making a proximity payment device in accordance with aspects of the present invention.

Figure 2:
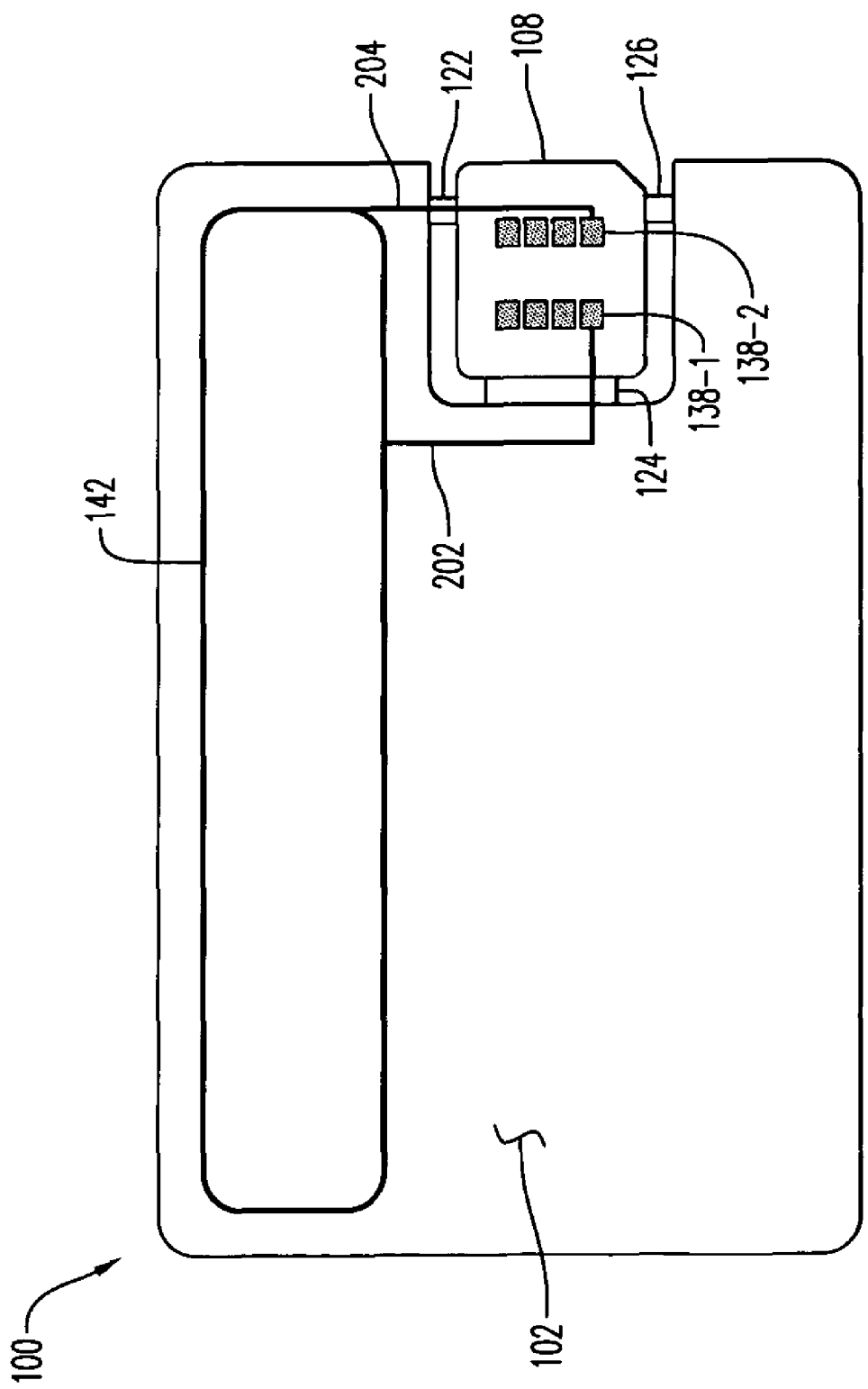
FIG. 2 is a view similar to FIG. 1, but also showing some electrically functional aspects of the ID-1 carrier/small subcard arrangement.

At 302 in FIG. 3, a carrier/subcard arrangement is provided such as that shown in FIGS. 1 and 2. At 304 in FIG. 3, a process step customarily referred to as "pre-personalization" is performed with respect to the subcard 108. As is familiar to those who are skilled in the art, pre-personalization entails writing into the RFID IC of a payment card or similar device certain information such as loading of keys to be used in subsequent transactions and setting of parameters (such as to select a particular card brand to be borne by the subcard 108). In addition, information such as a payment card association brand, etc., may be printed on the subcard 108 as part of the pre-personalization process. The information stored in the RFID IC and/or printed on the subcard may be such as is common to all subcards processed in a particular production run. According to some aspects of the invention, the pre-personalization, possibly along with subsequent steps of the process, may be performed by standard equipment configured to communicate wirelessly with non-contact ("proximity") ID-1 cards. Accordingly, as part of the pre-personalization steps, or as another part of the process not explicitly indicated in FIG. 3, the carrier/subcard arrangement 100 may be loaded (e.g., as part of a batch of like carrier/subcard arrangements) into conventional personalization equipment. The personalization equipment handles the carrier/subcard arrangement 100 as if the carrier/subcard arrangement 100 were a conventional non-contact ID-1 card, and communicates with the RFID IC in the subcard 108 via the antenna 142 embedded in the carrier 102.

As will be understood from previous discussion, the personalization equipment referred to in the previous paragraph may be a standard item of equipment, and need not have been modified by changing the location of a card-handling suction cup.

At 306 in FIG. 3, a process step customarily referred to as "personalization" is performed with respect to the subcard 108. This step may, but need not, be performed by the same personalization equipment which performed step 304, or by a similar piece of equipment. This step may, but need not, be performed prior to removing the carrier/subcard arrangement from the personalization equipment which performed step 304. Alternatively, step 306 may occur after the carrier/subcard arrangement is removed from the personalization equipment referred to in the previous sentence and after loading the carrier/subcard into another, but similar, piece of personalization equipment.

In the personalization step 306, the subcard 108 is effectively assigned to a particular payment card account and/or to a particular account holder by writing into the RFID IC 137 (again via radio frequency communication through the antenna 142 in the carrier 102) information such as a payment card account number and the name of the account holder. Other information, such as expiration date, may be stored in either of the pre-personalization and personalization steps. Moreover, the pre-personalization and personalization steps may be combined in one operation. Such an operation (or operations, if the steps are performed separately) may be performed by use of an item of conventional contactless card programming equipment, such as the model 9000 available from Datacard Group, Minnetonka, Minn.

In addition to encompassing writing of data into the RFID IC 137, personalization may also include printing card-specific (i.e., account-/account-holder-specific) information on the subcard 108.

At 308 in FIG. 3, the subcard 108 is detached from the carrier 102. For example, this may be done by the account holder, after the carrier/subcard arrangement 100 has been mailed to the account holder from the card issuer (issuing bank). The detaching of the subcard 108 from the carrier 102 may be accomplished by snapping the tabs 122, 124, 126 (i.e., by snapping the subcard 108 from the tabs 122, 124, 126 and from the carrier 102). This operation also effectively detaches the subcard 108 and the RFID IC 137 from the antenna 142. Further, this operation breaks the connections 202, 204 between the antenna 142 and the RFID IC 137.

The subcard 108 may alternatively be detached from the carrier by the issuer, either manually or by suitable automated equipment.

FIGS. 4 and 4A are plan views that illustrate (different aspects of) the subcard 108 in isolation from the carrier 102 (e.g., after the subcard has been detached from the carrier).

At 310 in FIG. 3, the subcard 108 is installed in a device so that the device becomes a proximity payment device. The device may be, for example, a wristwatch, a wristband or a bracelet. The device may include an antenna to which the RFID IC is coupled by the installation of the subcard in the device. This may be done by spring-loaded or spring contacts in the device brought into electrically conductive contact with one or more of the contacts 138 by installation of the subcard in the device.

Figure 5:
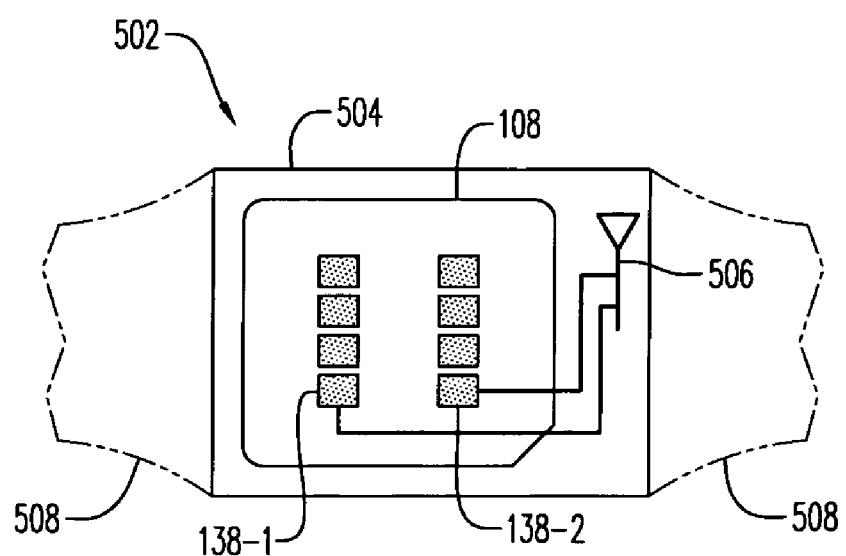
FIG. 5 is a schematic plan view of a proximity payment device that includes the subcard.

FIG. 5 is a schematic view of an example embodiment of a proximity payment device 502 (e.g., a wristwatch) of the type which is produced at step 310. Reference numeral 504 indicates the watch case or housing in which the subcard 108 has been installed. Reference numeral 506 indicates a schematic representation of an antenna to which the subcard is electrically conductively coupled while installed in the device 502. (In practice this may be a small loop or ferrite antenna.) The conductive connection between the subcard 108 and the antenna 506 (i.e., between the RFID IC 137—FIG. 4A, not separately shown in FIG. 5—and the antenna 506) may be via the contacts 138-1, 138-2, or by other contacts in an arrangement which is not illustrated. The antenna 506 may be embedded in and/or supported by the watch case/housing 504. The device 502 may include a wristband 508 secured to the watch case/housing 504.

The device 502 may, for example, also include one or more conventional wristwatch components which are not shown. Among these components may be a movement, a numeric liquid crystal display, a wristwatch chip, a battery, etc. The proximity payment device 502 need not be a wristwatch but may rather be a wristband or a bracelet, or a pendant, etc.

The proximity payment device 502 may operate in a conventional manner. For example, the proximity payment device may operate in accordance with the above-mentioned "PayPass" standard. The proximity payment device 502 may be presented to a proximity reader (not shown) of a POS terminal (not shown) to accomplish payment for a sales transaction. When the proximity payment device is presented to the proximity reader, the device receives and/or is powered up by an interrogation signal from the proximity reader. The proximity payment device 502 receives the interrogation signal via the antenna 506. The received interrogation signal may power-up the RFID IC 137. Possibly after a handshake procedure or the like, the RFID IC may transmit a payment card account number and/or other information to the POS terminal via the antenna 506. The POS terminal may then interact with the payment card system to charge the current sales transaction to the payment card account represented by the payment card account number received from the proximity payment device 502.

Figure 6:
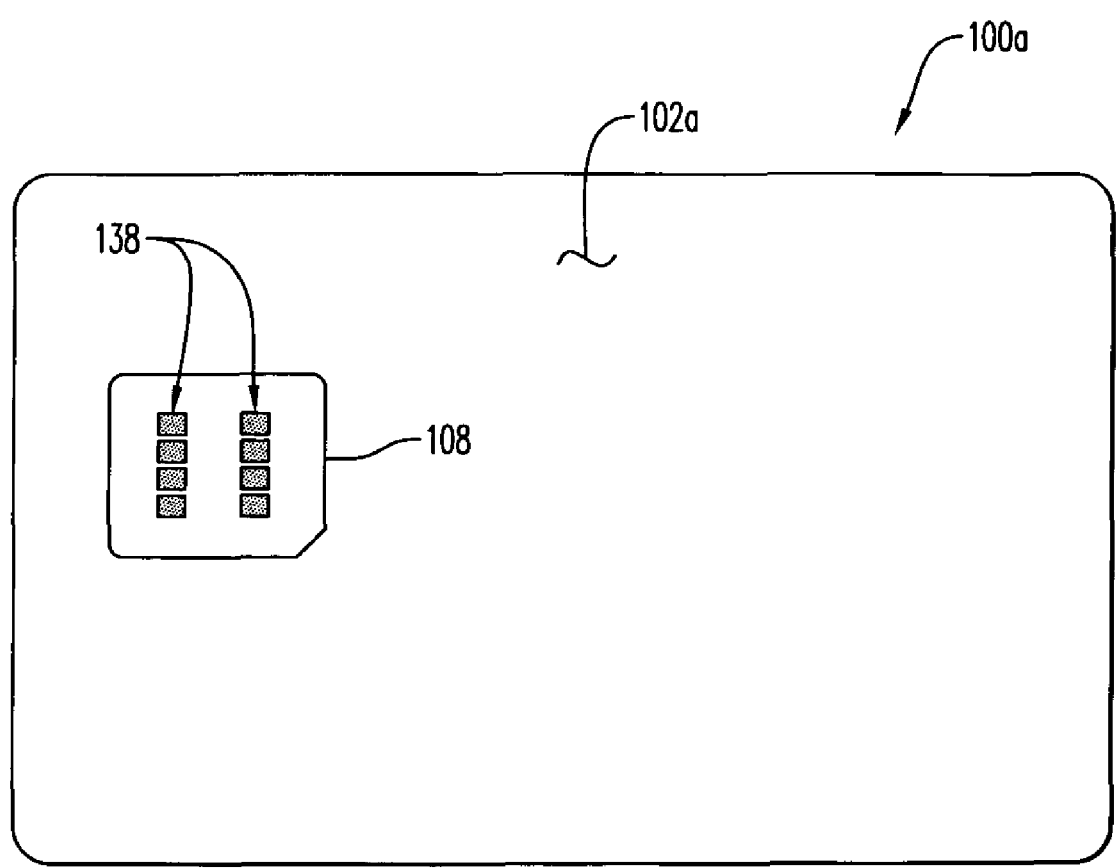
FIG. 6 is a plan view that schematically illustrates another embodiment of a carrier/subcard arrangement.

FIG. 6 is a plan view that schematically illustrates another embodiment of a carrier/subcard arrangement (indicated generally by reference numeral 100a in FIG. 6). The carrier/subcard arrangement 100a shown in FIG. 6 differs from the carrier subcard arrangement 100 of FIGS. 1-2 primarily in terms of the location of the subcard 108 within the carrier 102a shown in FIG. 6. In particular, the subcard 108 is located in carrier 102a in the embodiment of FIG. 6 such that the contacts 138 are located relative to the carrier 102a in compliance with the provisions of the ID-1 standard relative to the location of contacts within the ID-1 geometry. The subcard 108 may accordingly be arranged for personalization via standard contact personalization equipment, except that the personalization equipment would require modification of the location of the card-handling suction cup referred to above. This is because the voids to define the subcard 108 in the embodiment of FIG. 6 may fall within the keep-out zone described above in connection with FIG. 1. (In FIG. 6, the punching and/or scoring and/or voids which define the subcard 108 within the carrier 102a are collectively represented simply by the outline of subcard 108. The total length of the voids, inclusive of tabs—not shown—that detachably attach the subcard to the carrier, may be about 64 mm. This total length corresponds to twice the length (17 mm) plus twice the height (15 mm) of the subcard.) Alternatively, the carrier 102a may include an antenna that is electrically conductively coupled by suitable connections to the RFID IC (not separately shown in FIG. 6) of the subcard 108. The layout of the antenna and the connections to the RFID IC (not shown in FIG. 6) may be different in the embodiment of FIG. 6 than in the embodiment of FIGS. 1 and 2. If an antenna is present in the carrier 102a, the process of FIG. 3 may be applied to the carrier/subcard arrangement 100a, except that the contactless personalization equipment may need to be modified to move the card-handling suction cup to be clear of the subcard location shown in FIG. 6.

The subcard shown herein with dimensions of substantially 17 mm by 15 mm may, in various embodiments, be suitable for use with contactless readers, or with contact readers, or may be a so-called "dual interface" device that is usable with both contactless and contact readers. Accordingly, the IC in the subcard may be arranged to support either one of, or both, contactless and contact reading.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. An apparatus comprising a first substantially card-shaped body having a plurality of voids formed therein to define sides of a second substantially card-shaped body smaller than the first body and detachable from the first body, the second body joined to the first body by a plurality of breakable tabs, the voids having a total length, inclusive of the tabs, that does not substantially exceed about 64 mm;
    wherein the voids are located in the first body such that the voids are clear of a keep-out zone on the first body, the first body having dimensions of substantially 86 mm by 54 mm, the keep-out zone defined as the locus at which a suction cup of standard card personalization equipment contacts the first body and being shaped as a circle, the circle being centered at substantially 30.7 mm from a top edge of the first body and at substantially 36.5 mm from a left edge of the first body, the circle being substantially 43 mm in diameter.

2. The apparatus of claim 1, wherein the total length of the voids does not substantially exceed 49 mm.

3. An apparatus comprising:
    a first substantially card-shaped body having a plurality of voids formed therein to define sides of a second substantially card-shaped body smaller than the first body and detachable from the first body, the second body joined to the first body by a plurality of breakable tabs, the voids having a total length, inclusive of the tabs, that does not substantially exceed about 64 mm;
    an antenna embedded in the first body;
    a plurality of electrically conductive contacts on the second body;
    a first electrically conductive connection passing through a first one of the tabs to electrically conductively connect the antenna to a first one of the contacts; and
    a second electrically conductive connection passing through a second one of the tabs to electrically conductively connect the antenna to a second one of the contacts;
    wherein detaching of the second body from the first body breaks the breakable tabs, thereby breaking said first and second electrically conductive connections.

4. The apparatus of claim 3, further comprising:
    a radio frequency identification (RFID) integrated circuit (IC) embedded in the second body and electrically conductively connected to the first one of the contacts and to the second one of the contacts.

5. The apparatus of claim 3, wherein the second body shares an outer edge with the first body.

6. The apparatus of claim 5, wherein the total length of the voids does not substantially exceed 49 mm.

7. The apparatus of claim 3, wherein the second body has dimensions of substantially 17 mm by 15 mm.

8. An apparatus comprising a card-shaped carrier and a subcard defined within the carrier by voids in the carrier, the subcard joined to the carrier by a plurality of breakable tabs, the voids having a total length, inclusive of the tabs, that does not substantially exceed 64 mm;
    wherein the voids are located in the carrier such that the voids are clear of a keep-out zone on the carrier, the carrier having dimensions of substantially 86 mm by 54 mm, the keep-out zone defined as the locus at which a suction cup of standard card personalization equipment contacts the carrier and being shaped as a circle, the circle being centered at substantially 30.7 mm from a top edge of the carrier and at substantially 36.5 mm from a left edge of the carrier, the circle being substantially 43 mm in diameter.

9. The apparatus of claim 8, further comprising:
    an antenna embedded in the carrier;
    a plurality of electrically conductive contacts on the subcard;
    a first electrically conductive connection passing through a first one of the tabs to electrically conductively connect the antenna to a first one of the contacts; and
    a second electrically conductive connection passing through a second one of the tabs to electrically conductively connect the antenna to a second one of the contacts.

10. The apparatus of claim 9, further comprising:
    a radio frequency identification (RFID) integrated circuit (IC) embedded in the subcard and electrically conductively connected to the first one of the contacts and to the second one of the contacts.

11. The apparatus of claim 8, wherein the subcard shares an outer edge with the carrier.

12. The apparatus of claim 11, wherein the total length of the voids does not substantially exceed 49 mm.

13. The apparatus of claim 8, wherein the total length of the voids does not substantially exceed 49 mm.

* * * * *